Figure 1:
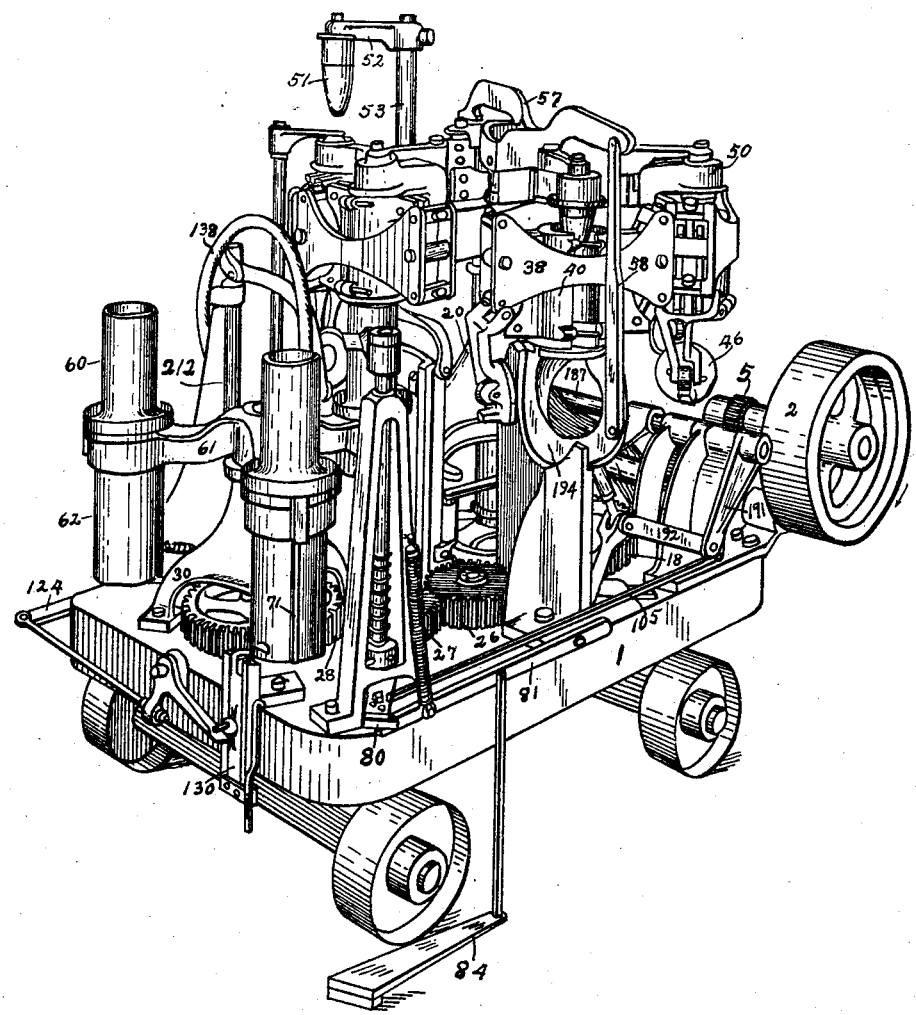

No. 672,987. Patented Apr. 30, 1901.
G. C. PYLE.
MACHINE FOR MAKING HOLLOW GLASSWARE.
(Application filed Nov. 6, 1899.)
(No Model.) 10 Sheets—Sheet 3.

WITNESSES: G. H. Blaker. M. C. Buck.

INVENTOR. George C. Pyle BY V. H. Lockwood His ATTORNEY.

No. 672,987. Patented Apr. 30, 1901.
G. C. PYLE.
MACHINE FOR MAKING HOLLOW GLASSWARE.
(Application filed Nov. 6, 1899.)
(No Model.) 10 Sheets—Sheet 5.

WITNESSES: INVENTOR.
G. H. Blaker. George C Pyle
M. C. Buck. BY V H Lockwood
His ATTORNEY.

No. 672,987. Patented Apr. 30, 1901.
G. C. PYLE.
MACHINE FOR MAKING HOLLOW GLASSWARE.
(Application filed Nov. 6, 1899.)
(No Model.) 10 Sheets—Sheet 6.

WITNESSES:
G. H. Blaker.
M. C. Buck.

INVENTOR.
George C. Pyle
BY V. H. Lockwood,
His ATTORNEY.

No. 672,987. Patented Apr. 30, 1901.
G. C. PYLE.
MACHINE FOR MAKING HOLLOW GLASSWARE.
(Application filed Nov. 6, 1899.)

(No Model.) 10 Sheets—Sheet 7.

WITNESSES:
G. H. Blaker.
M. C. Buck.

INVENTOR.
George C. Pyle
BY V. H. Lockwood
His ATTORNEY.

No. 672,987.                                                Patented Apr. 30, 1901.
G. C. PYLE.
MACHINE FOR MAKING HOLLOW GLASSWARE.
(Application filed Nov. 6, 1899.)

(No Model.)                                                  10 Sheets—Sheet 8.

WITNESSES:                                                   INVENTOR.
G. H. Blaker.                                                George C. Pyle
M. C. Buck.                                            BY V. H. Lockwood
                                                             His ATTORNEY.

THE NORRIS PETERS CO., PHOTO-LITHO., WASHINGTON, D. C.

No. 672,987. Patented Apr. 30, 1901.
G. C. PYLE.
MACHINE FOR MAKING HOLLOW GLASSWARE.
(Application filed Nov. 6, 1899.)
(No Model.) 10 Sheets—Sheet 9.

WITNESSES:
M. C. Buck
G. H. Blaker

INVENTOR.
George C. Pyle
BY V. H. Lockwood
His ATTORNEY.

No. 672,987. Patented Apr. 30, 1901.
G. C. PYLE.
MACHINE FOR MAKING HOLLOW GLASSWARE.
(Application filed Nov. 6, 1899.)
(No Model.) 10 Sheets—Sheet 10.
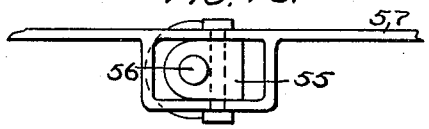
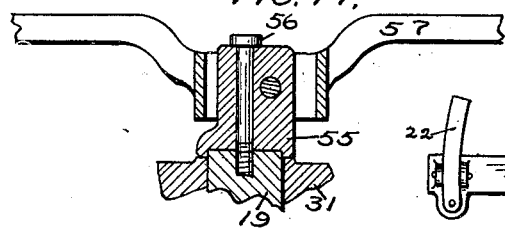
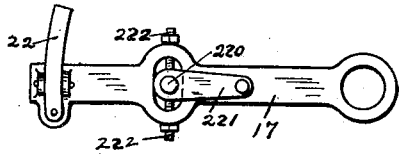
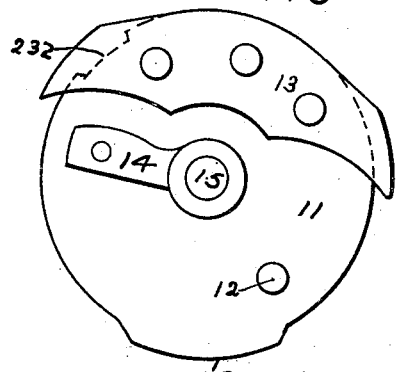
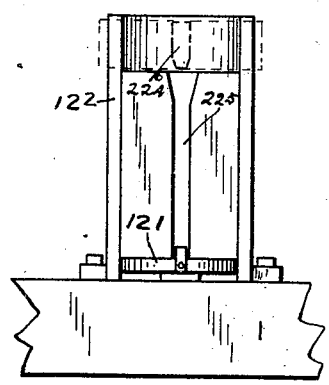
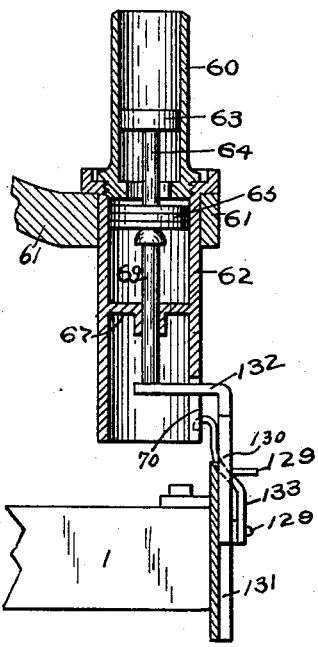
WITNESSES:
G. H. Blaker.
M. C. Back.
INVENTOR.
George C. Pyle
BY V. H. Lockwood.
His ATTORNEY.
THE NORRIS PETERS CO., PHOTO-LITHO., WASHINGTON, D. C.

UNITED STATES PATENT OFFICE.

GEORGE C. PYLE, OF INDIANAPOLIS, INDIANA.

MACHINE FOR MAKING HOLLOW GLASSWARE.

SPECIFICATION forming part of Letters Patent No. 672,987, dated April 30, 1901.

Application filed November 6, 1899. Serial No. 735,937. (No model.)

*To all whom it may concern:*

Be it known that I, GEORGE C. PYLE, of Indianapolis, county of Marion, and State of Indiana, have invented a certain new and useful Machine for Making Hollow Glassware; and I do hereby declare that the following is a full, clear, and exact description thereof, reference being had to the accompanying drawings, in which like figures refer to like parts.

My invention relates to a machine for making hollow glassware by combined pressing and blowing wherein the article is wholly made by the machine, the operator merely introducing the glass into the molds and the machine doing the rest, discharging the article completely finished. It is provided with a series of molds, so that the article can be made very rapidly, and yet one person suffices to supply the machine with glass and also keep it in operation.

The machine is provided with means of measuring the required amount of glass for the desired article, so that the operator need give no attention to that matter. After the glass is introduced, by the operation of a pedal located where the operator stands while he is introducing glass into the mold the proper amount of glass is cut off and the machine set in operation. The glass is initially introduced into a series of three inner or receiving molds horizontally rotatable. There is also a series of six outer molds horizontally rotatable and so placed that each one-third revolution of the inner or receiving molds and each one-sixth revolution of the outer molds bring an inner or receiving mold into which the glass has been introduced under an outer mold. The outer mold has an internal former extending down through its upper end. Then the machine elevates the inner or receiving mold that contains the glass through the lower end of the outer mold, and the glass therein is pressed about the internal former by the employment of compressed air acting upon a movable bottom in the inner or receiving mold. The glass therein is pressed up about the internal former with great rapidity and pressure. During this operation the gatherer or operator has secured another lot of glass and dropped it into the next inner or receiving mold, and the preceding inner or receiving mold is moved downward from the outer mold, leaving the partly-formed article suspended by its neck in the outer mold. Then the machine is automatically thrown out of gear and stops.

The foregoing is the first step in the operation, being a one-third revolution of the inner or receiving molds and one-sixth revolution of the outer molds and operation of accompanying parts. While the second inner or receiving mold that has been filled with glass is moving around into a position under an outer mold the outer mold containing the partly-formed article is moved one-sixth of a revolution to a point where it is blown, and during such movement the bottom thereof is closed. After such mold gets at rest a cap is brought down on the upper end thereof, and through it compressed air is introduced for blowing the article into complete form. This blowing of the article is simultaneous with the pressing of the article in the following mold and the filling of another inner or receiving mold. Before the operation is completed the air is shut off from the outer mold, the cap is released, and again the machine is thrown out of gear, and this constitutes the second step in the operation. Again the operator puts in another lot of glass, throws the machine in gear, and during the next one-sixth revolution of the outer molds and one-third revolution of the inner molds the outer mold containing the finished article reaches a point where the bottom is released and the internal former partly reënters the outer mold to guide the glass article out of it, and the outer mold is opened, whereupon the article is discharged upon a yielding inclined chute, which removes it from the machine. This discharge of the article is simultaneous with the charge of another inner or receiving mold, the pressing of another article to partially form it, and the blowing of another article into completed form, the four steps in the process occurring at the same time. While the outer mold is being opened for the discharge of the finished article the opposite molds in the series are being closed ready for another operation.

The cost of manufacture of hollow ware by this machine is considerably lessened as compared with the old blowing method, as the machine automatically manufactures the article from beginning to end without the intervention of the operator, excepting to set in operation when desired, and one operator suffices to manage the machine, although the output of the machine is very great.

The full nature of my invention will be understood from the accompanying drawings and the description following of one form of device embodying my said invention; and the scope of said invention will be understood from the claims following said description.

Figure 2:
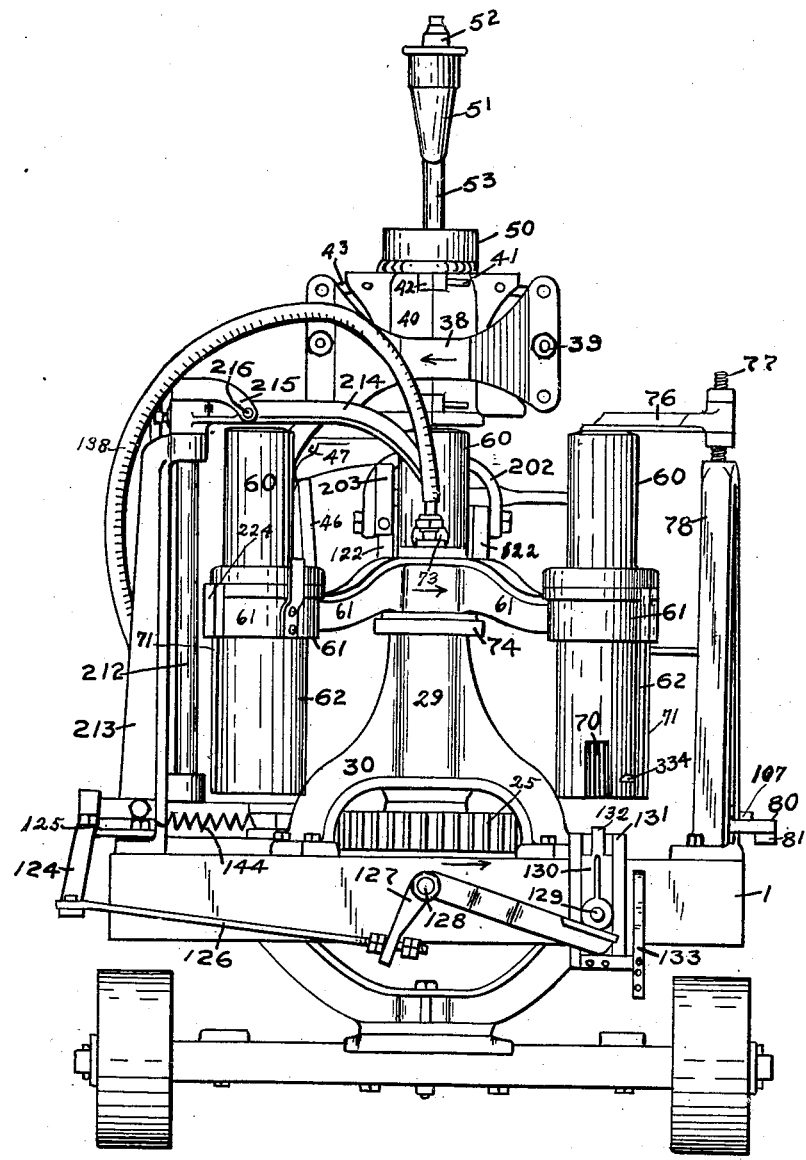
Figure 3:
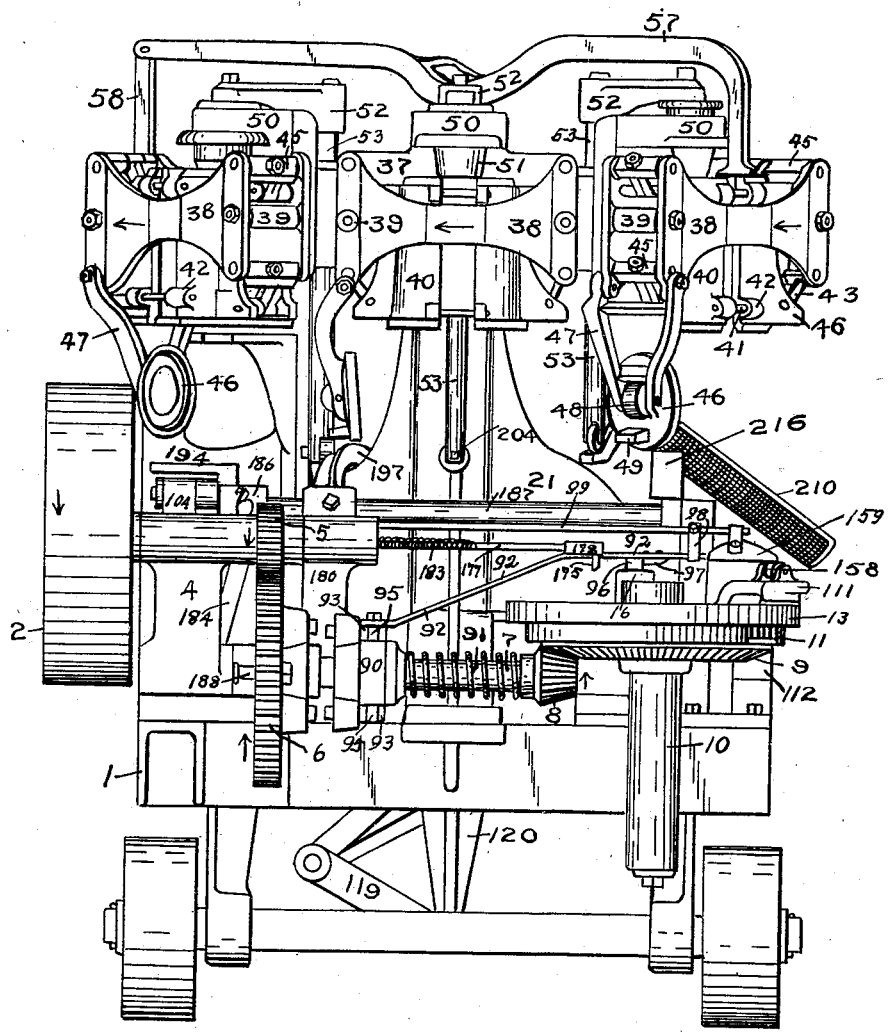
Figure 4:
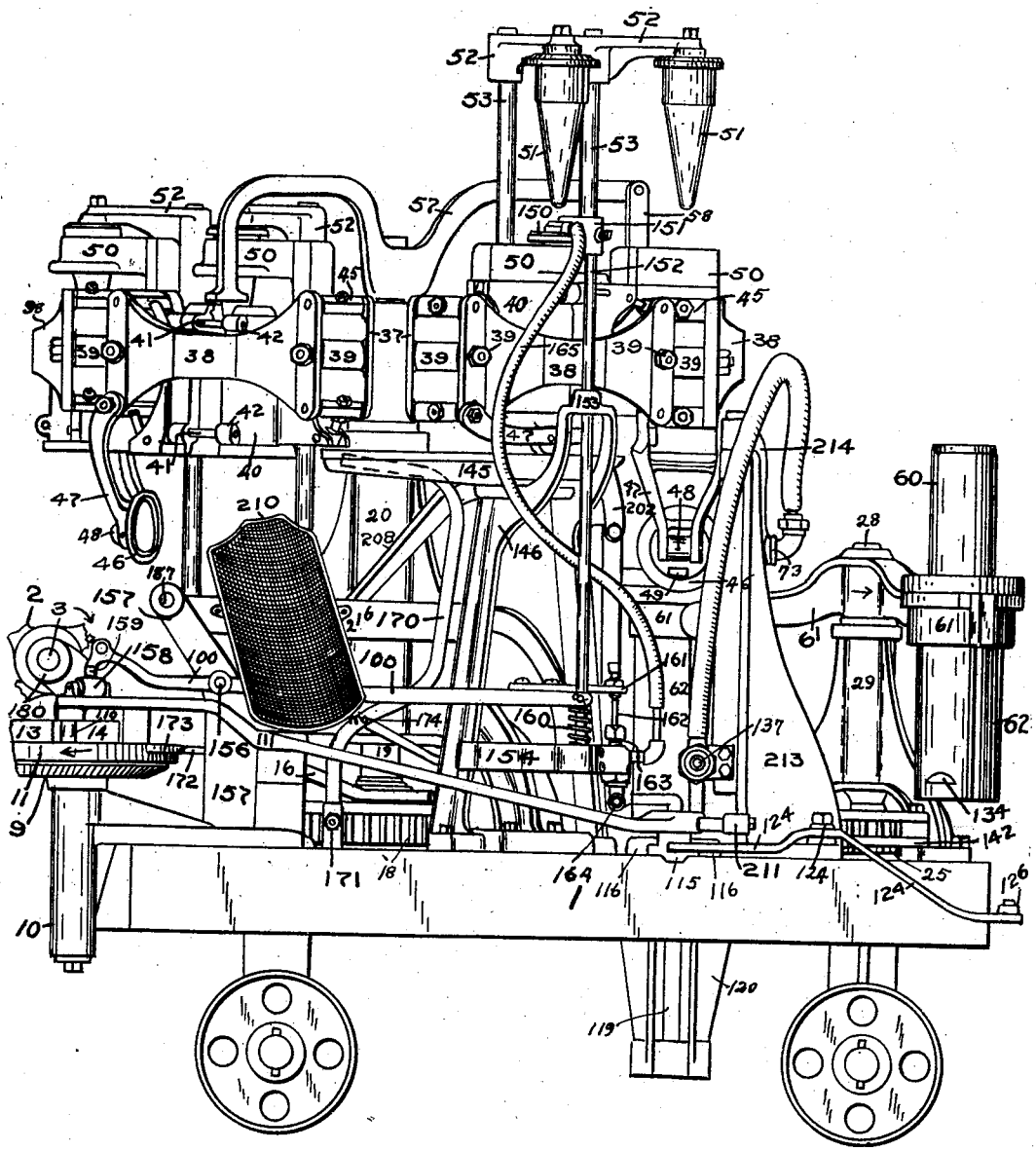
Figure 5:
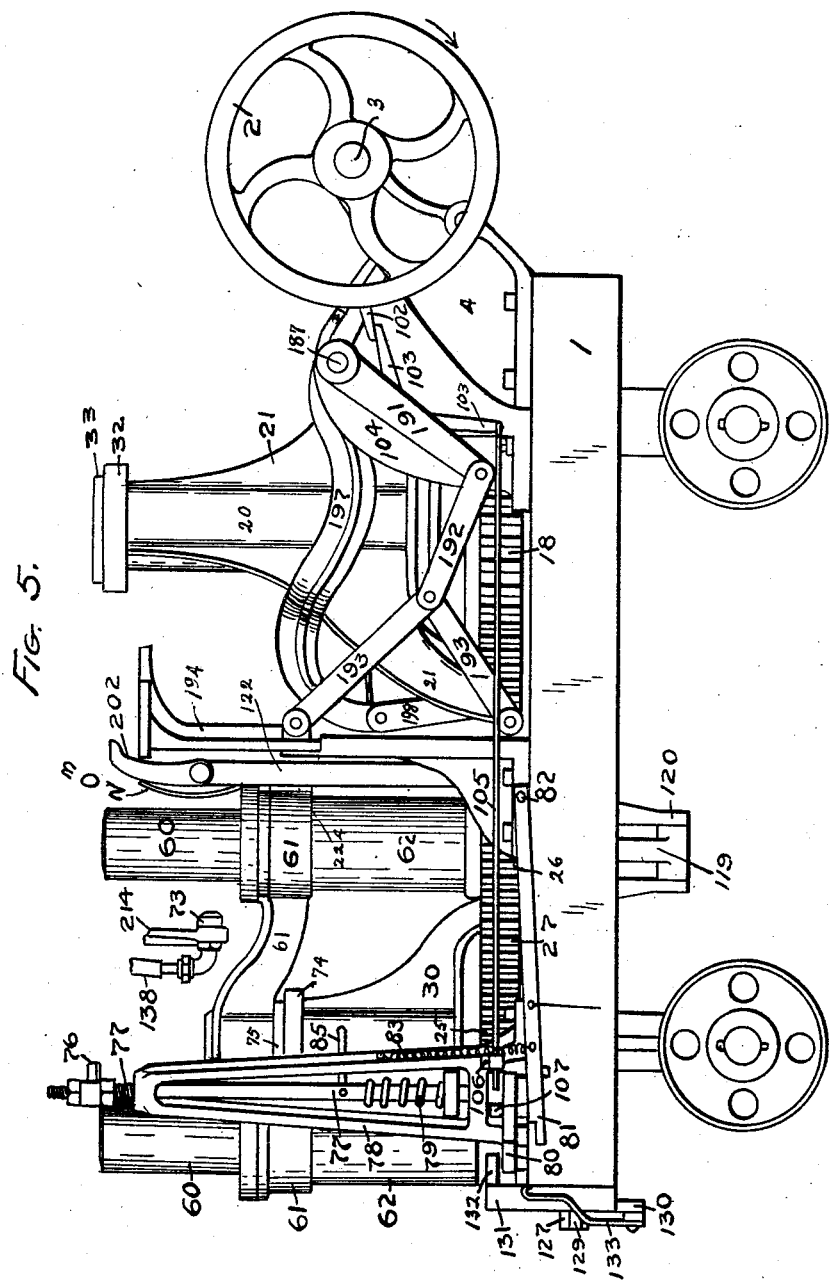
Figure 6:
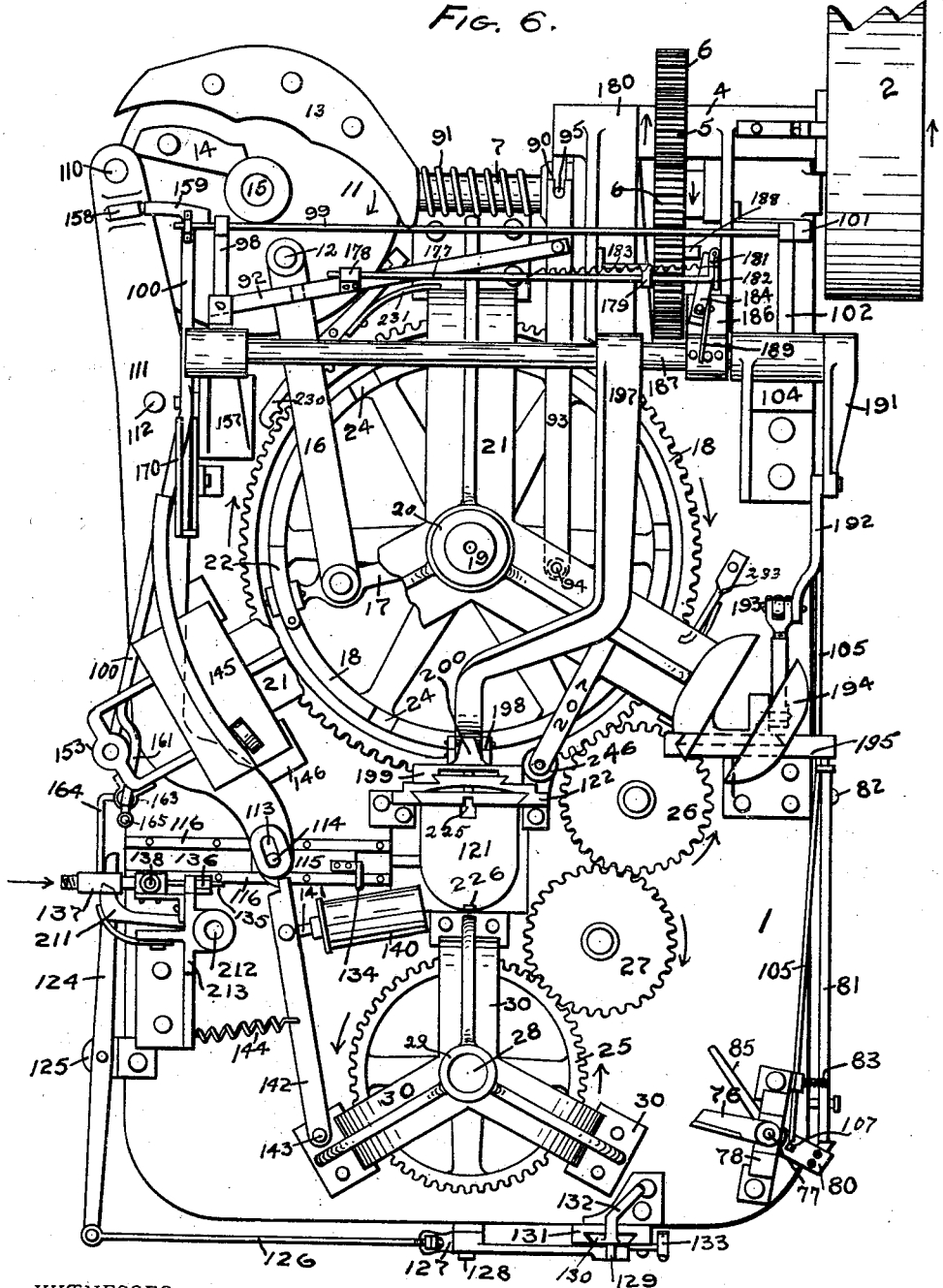
Figure 7:
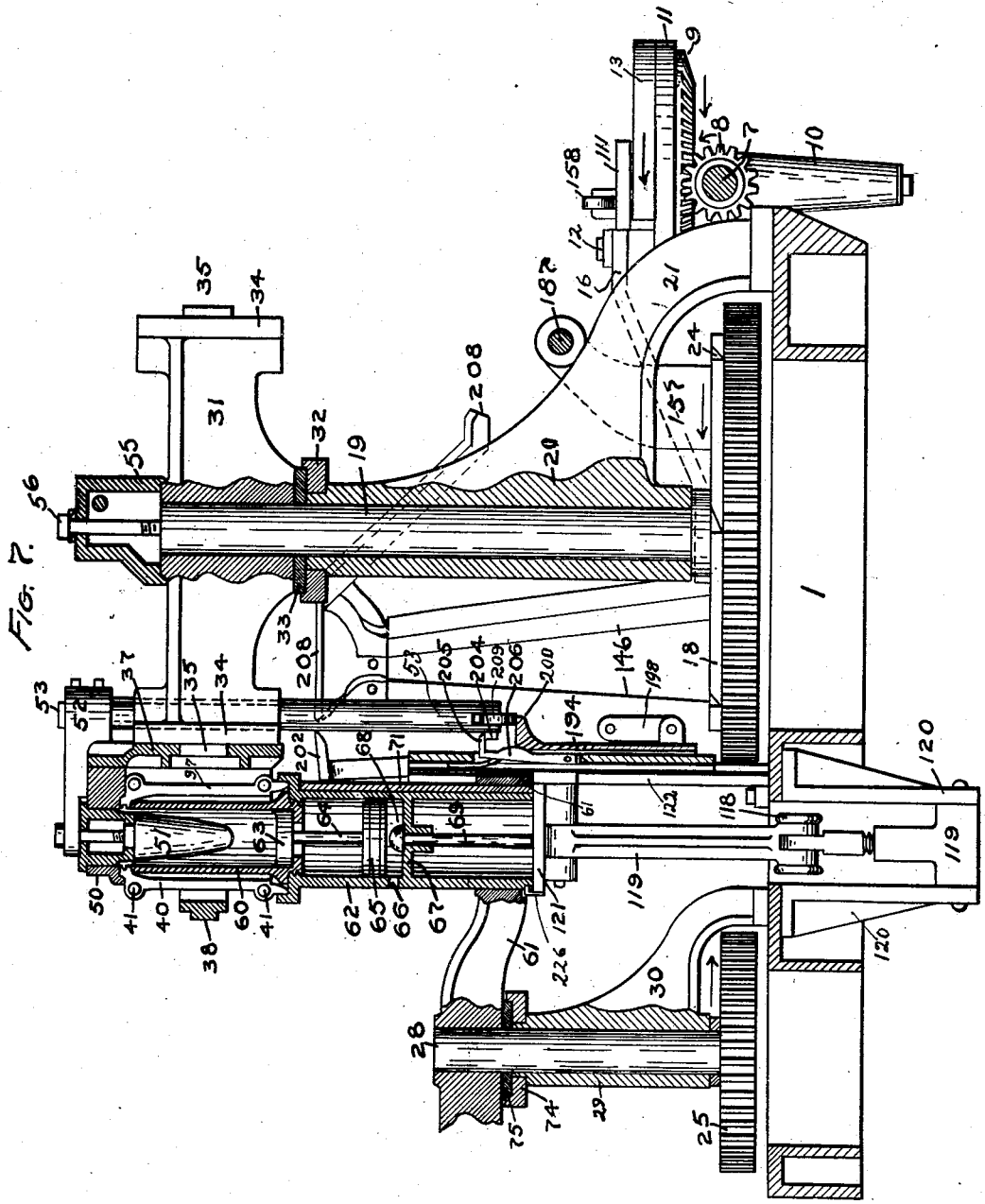
Figure 8:
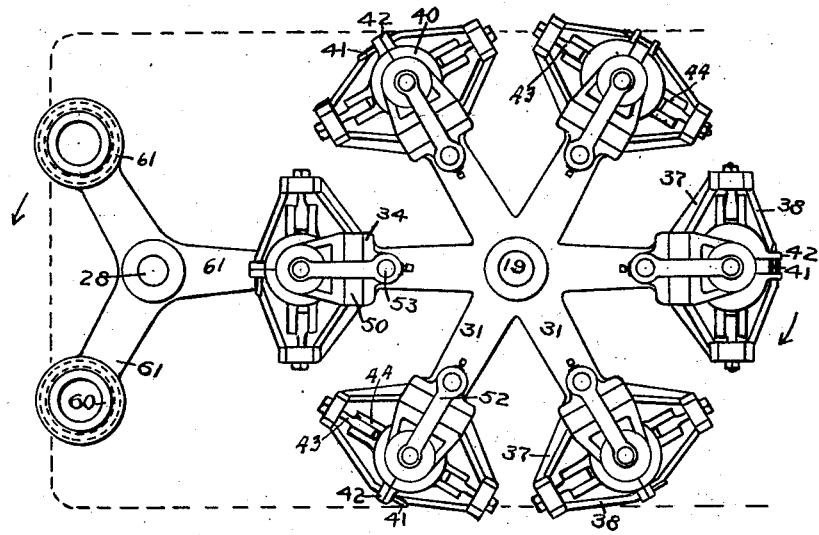
Figure 9:
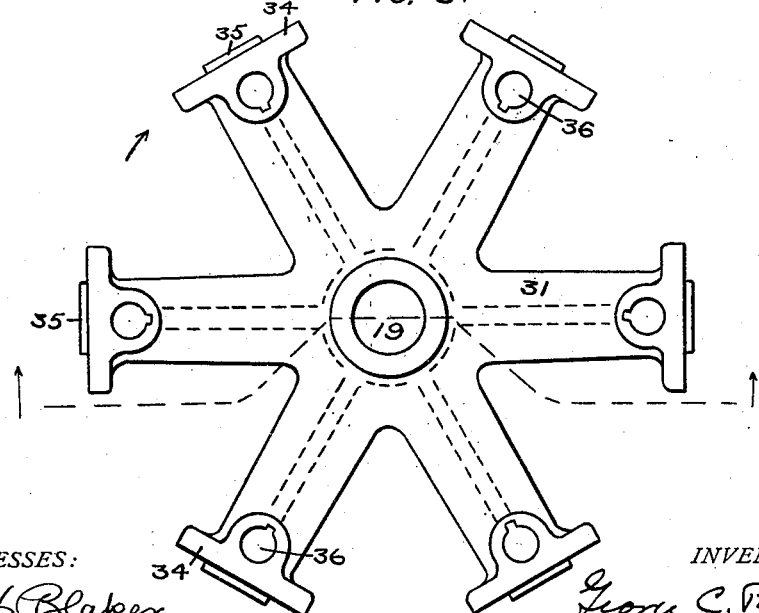
Figure 10:
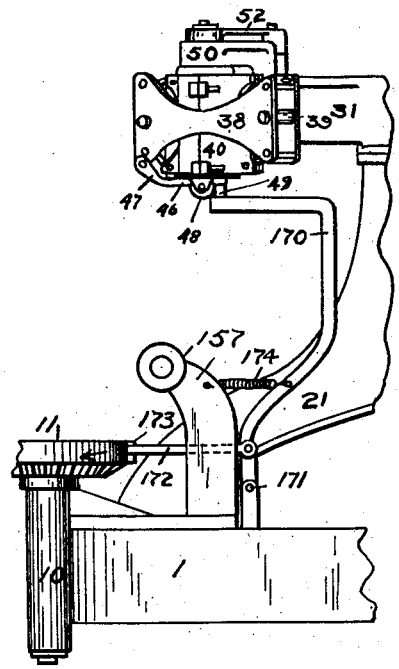
Figure 11:
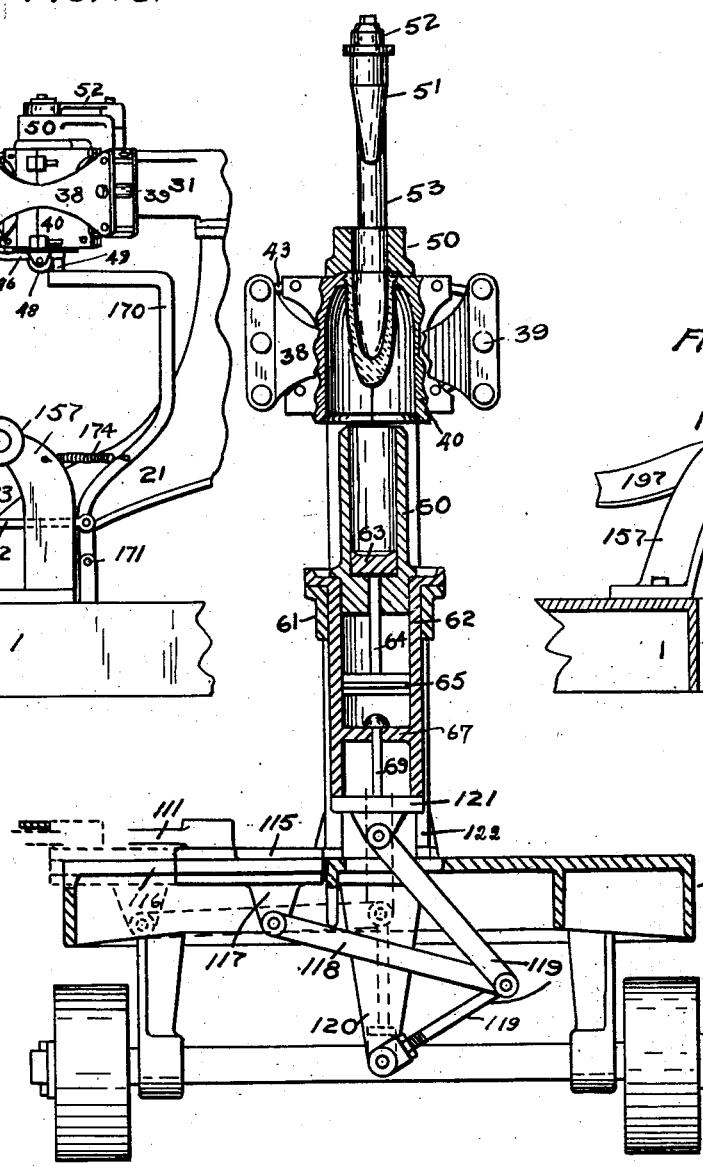
Figure 12:
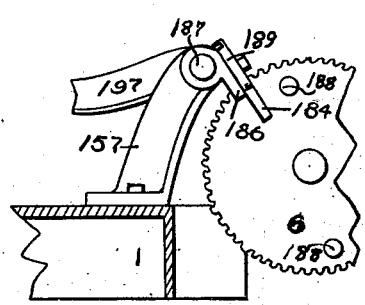

In the drawings, Figure 1 represents a perspective of the machine viewed from the standpoint of the operator. Fig. 2 is a front elevation thereof. Fig. 3 is a rear elevation thereof. Fig. 4 is an elevation of the left or discharging side. Fig. 5 is a right-side elevation of the machine with the outer molds, internal formers, and some other parts removed. Fig. 6 is a plan of the machine with the outer molds and internal formers and also the inner or receiving molds and air-pipes removed. Fig. 7 is a central vertical longitudinal section of the machine, excepting that the rotating arms and the legs supporting them are shown in side elevation. Fig. 8 is a plan of the inner and outer molds, the other parts not being shown. Fig. 9 is a plan of the rotating head or arms on which the outer molds are mounted. Fig. 10 is a detached portion of the machine, showing the position of some of the parts just previous to the opening of the mold and the discharge of the article therefrom. Fig. 11 is a central vertical section of a portion of the machine, including the base and trucks, the inner and outer molds, and internal former while they are in alinement immediately after the article has been partly formed by pressing. Fig. 12 is a detailed view showing the inside elevation of part of the means for actuating the mechanism that elevates the internal former out of the outer mold, opens the outer mold to discharge the glass, and closes the outer molds. Fig. 13 is a plan of the central part of the top cross-lever of the machine. Fig. 14 is a central vertical section of the part shown in Fig. 13. Fig. 15 is a plan of the radial arm that actuates the gear for rotating the molds. Fig. 16 is a plan of the cam-disk that drives and regulates the movement of the molds and means for admitting air therein. Fig. 17 is the inner mold and air-cylinder thereunder with the means for gaging the amount of glass in position. Fig. 18 is a front elevation of the table upon which the air-cylinder and inner or receiving mold are elevated and the means for guiding its movement, with the base of the machine partly broken away.

In detail, 1 is the base, that is carried upon suitable trucks.

2 is the driving-pulley, that is mounted on the shaft 3 in the arms 4 and 180 from the base and is driven from some suitable source of power. Said shaft 3 carries a pinion 5, which meshes with a gear-wheel 6, secured on the shaft 7, that is mounted also in the arm 4. On the inner end of shaft 7 there is a bevel-pinion 8. This pinion engages the bevel-gear 9, secured on a vertical shaft 15, that is mounted in the box 10. A disk 11 is secured concentrically on top of the bevel-gear 9. Said disk carries a pin 12 away from the center and also carries the cams 13 and 14, (to be seen in Figs. 6 and 16.) The pin 12 has pivoted to it one end of a connecting-bar 16, which at its other end is pivoted to the radial arm 17 on the large gear 18. Said gear 18 is carried by a vertical shaft 19, that extends through the tripod-stand 20, whose legs 21 are bolted to the base. The radial arm 17 is pivotally mounted on the shaft 19 and carries on its outer end a pawl 22, (seen in Fig. 6,) that rests upon the ring 23, which is a part of the gear 18. Said ring is divided into six equal sections separated by the notches 24, which have a square face for the engagement of the pawl 22. By this means when the bar 16 is pulled back the pawl moves the gear 18 one-sixth of a revolution; but the return movement of the bar 16 does not actuate said gear. As seen in Fig. 15, the bar 16 (not there shown) is adjustably connected to the radial arm 17. Said bar is connected by the bolt 220 to the short arm 221, pivoted to the radial arm 17, and the set-screws adjustably hold said arm 222 in the position desired. The gear 18 drives the gear 25 through the intermediate gears 26 and 27, said gear 25 having one-half the number of teeth that the gear 18 has, whereby it rotates twice while the gear 18 rotates once. The idle gears 26 and 27 are mounted on the base, and the gear 25 is secured on a vertical shaft 28, that is carried on the stand 29, whose lugs 30 are bolted to the base. These constitute the main driving parts of the machine.

A number of outer molds is carried on the upper end of the shaft 19. I here show six outer molds. A casting with six arms 31 is secured on the upper end of said shaft 19, as seen in Figs. 8 and 9. On the upper end of the stand 21 I secure a stationary collar 32 to furnish a large bearing-surface for the phosphor-bronze bearing-ring 33, that is secured to the casting 31. (Seen in Figs. 5 and 7.) Each of the six arms 31 has on its outer end a vertical face 34, with a round guide-lug 35, and said arms have also near the outer ends the hole 36. The outer mold is carried in a frame or yoke formed of an inner member 37, that is bolted on the face 34 of the arm 31.

Said member of the frame has a round aperture through which the lug 35 extends, as appears in Fig. 7. Said mold frame or yoke consists of the inner member, referred to above, and an outer member 38, whose ends are held together by the stud 39 and suitable nuts. In this manner the two members of the mold frame or yoke are held apart, and the outer mold is mounted between them, as seen in Fig. 8.

There is an outer mold 40, formed of two vertical members or halves, one member having guide-pins 41 in its face that move in guide-holes in the ears 42 on the other member. Said members or halves of the outer mold are supported by bars 43, that are pivoted at one end to the ears 44 on the mold and at the other end to the loose pin 45. It is obvious that when the members of the outer mold 40 are elevated they will be held together by the toggles 43 and when depressed will move apart. A bottom 46 for said outer mold is carried on a double arm 47, pivoted to the yoke or frame surrounding the mold, as seen in Fig. 3. On the under side of said bottom 46 there is a friction-roller 48 and also a lug 49. A bracket 50 is bolted to the upper portion of the inner member 37 of the mold frame or yoke and extends over the outer mold and has an opening through it for the internal former 51, as seen in Fig. 7. Said internal former is centrally carried over the outer mold by the arm 52, secured to the upper end of a rod 53, which is vertically reciprocable in the hole 36 in the arm 31. Said rod 53 has on it a spline (shown in Fig. 7) that operates in the slot shown in the side of the hole 36. (See Fig. 9.) Therefore said internal former is vertically reciprocable, but not otherwise movable. There is likewise loosely mounted on the upper end of the vertical shaft 19 a turret-block 55, that is held in place by the stud 56. To this turret I pin a horizontal lever 57, (to be seen in Figs. 1, 3, 4, 13, and 14.) It is actuated through the connecting-bar 58 at one end, which is vertically operated by means hereinafter explained. The other end in its descent strikes the top lugs and pins 41 and 42 of the outer mold, thus forcing the mold downward, which movement by reason of the bars 43 causes the two members of the mold to spread, thus opening the mold for the discharge of the glass article. Said lever 57 does not rotate.

In this machine the molds are of the same general character and the system of molding is substantially the same as set forth in my former Letters Patent of the United States, dated May 29, 1900, No. 650,655. Three inner or receiving molds 60 are carried on the arms 61, secured to the upper end of the vertical shaft 28, which is rotated by the means above explained, as appears in Figs. 5 and 6. The lower end of the mold 60 is threaded and screws into the upper end of an air-cylinder 62. The inner or receiving mold 60 is provided with a movable bottom 63, connected by the stem 64 to the piston 65 in said air-cylinder 62. Air is admitted into said air-cylinder through the port 66. The bottom of the air-cylinder proper is placed about midway, as shown in Fig. 7, and is provided with the check 68, having a stem 69, that extends down to the bottom of the air-cylinder 62. In the lower part of said cylinder 62 there is a vertical slot 70, to be seen in Fig. 17, through which means hereinafter to be described operates to move the stem 69, and through it the piston 65, stem 64, and movable bottom 63, upward to a certain point in order to gage the amount of glass that goes in the inner mold to make the desired article. The air-cylinder 62 is provided with the spline 71, that operates in a suitable groove in the arm 61, through which said air-cylinder vertically reciprocates. This is to prevent the rotation of the air-cylinder in said ring 72, so that when the inner mold is revolved around into the position shown in Fig. 5 the air-port 66 will always be in position to receive the nozzle 73 of the means for conveying compressed air into said cylinder. There is a bearing-collar 74 on the upper end of the stand 30, and a phosphor-bronze ring 75 is secured to the under side of the casting carrying the arms 61, and this ring operates upon the collar 74. After the glass is put into the inner or receiving mold the proper amount of glass is cut off by the knife 76, secured on the upper end of the shaft 77, that is vertically mounted in the stand 78. Said shaft 77 is actuated by the spiral spring 79.

80 is a lateral arm from the lower end of the shaft 77, which engages in a notch in the end of the trip-lever 81, which is pivoted at 82 to the framework and is supported by the spring 83. When said arm 80 engages in the notch in the end of the lever 81, said lever holds the shaft 77 and the knife 76 thereon in an inoperative position. They are operated by the pedal 84 drawing downward the end of the lever 81, so that it will disengage the arm 80, whereupon the spring 79 will suddenly cause a partial rotation of the shaft 77, so that the knife will pass over the top of the inner or receiving mold. The shaft 77 is provided with the arm 85, that extends in the path of the air-cylinder 62. In this manner after the proper amount of glass is cut off the further rotation of the air-cylinder and inner or receiving mold will cause it to engage the arm 85 and push it backward, thus rotating the shaft 77 sufficiently far to enable the lever 81 to catch the arm 80 from the lower end of said shaft 77, as seen in Fig. 6, and hold it until it is tripped again.

On the shaft 7 I mount a clutch 90, that engages the corresponding clutch-face (shown in Fig. 3) on the side of the gear 6, where the clutch is out of engagement. This clutch construction is an ordinary one familiar to all skilled in the art. It is held in engagement by the spiral spring 91, which lies between said clutch and the bevel-pinion 8. Said clutch is uncoupled by means of the trip-bar 92, pivoted at one end to the lever 93, which is fulcrumed at 94 to the under side of one of the legs 21, and at its outer end is formed into a yoke having notches or slots in its ends that receive the pins 95, there being one above and one below, as seen in Figs. 3 and 6. Said trip-bar 92 is moved to the left, as seen in Fig. 6, to disengage the clutch by means of the upwardly-extending lug 96 on the lever 16, just beneath said trip-bar 92, (shown in Fig. 3,) which engages a corresponding lug 97 on the under side of the trip-bar 92. When the disk 11 is rotated, said trip-bar 92 will be moved to the left, as shown in Fig. 6, which will uncouple the clutch and throw the machine out of gear. The trip-bar 92 is disengaged from the lever 16 by its left end, as shown in Fig. 6, being elevated by the finger 98 on the rod 99. Such elevation of the left end of the trip-bar 92 causes the lug 97 to disengage the lug 96. Said rod 99 is mounted at the left-hand end, as shown in Fig. 6, in the end of the lever 100 and at the other end in the arm 101, secured to the arm 4 from the base. Said rod 99 is actuated or partially rotated through an arm 102, that is engaged by one arm of the bell-crank 103, which is pivoted to the outside of the arm 104, bolted to the base, as will be understood from Figs. 5 and 6. From the lower end of said bell-crank 103 a rod 105 extends through the bracket 106. The left-hand end of said rod, as shown in Fig. 6, is engaged by the lug 107 on the upper side of the arm 80 from the lower end of the shaft 77. Therefore when the trip-bar 81 is disengaged from said arm 80, so as to allow the latter to be thrown to the right, as shown in Fig. 5, the lug 107 engages the end of the rod 105, which through the bell-crank 103 throws up the end of the arm 102, thus partially rotating the rod 99 and through the finger 98 disengaging the trip-bar 92 from the lever 16. This permits the spring 91 to force the clutch 90 into engagement with the clutch-face on the side of the gear 6, and thereby the machine is thrown into gear, and it remains in gear until another revolution of the disk 11—that is, until the lug 96 again engages the lug 97.

Attention has already been called to the cam 13 on the upper side of the disk 11, (to be seen in Figs. 6 and 16.) When said disk is further rotated, the cam-face—that is, the inner face, as shown — engages the downwardly-extending pin 110 on the end of the lever 111. Said lever 111 is fulcrumed on the lug 112, that forms a part of the casting 10. The other end of said lever 111 is turned inward, as shown in Fig. 6, and is provided with the slot 113, that receives the pin 114 on the sliding block 115, reciprocable between the guide-strips 116. An ear 117 extends downward from the sliding block or plate 115, and to it the rod 118 is pivoted at one end and at the other end is pivoted to the toggle 119. The lower end of said toggle is pivoted to two brackets 120, depending from the base, and the upper end of the toggle extends through the opening in the base and is pivoted to the lower end of the vertically-sliding table 121. Said table, as shown in Figs. 11 and 18, has a vertical back which slides in the vertical guide 122. This is for the purpose of elevating the inner or receiving mold and air-cylinder from the position shown in Fig. 11 up to the outer mold, as shown in Fig. 7. As the cam 13 engages the pin 110 on the lever 111 it will draw the end of said lever in which the pin 110 is located toward the center of the disk 11 and will cause the other end of said lever 111 to move outward, or to the left, as shown in Fig. 6. In such outward movement the left end of the sliding block 115 engages and actuates the lever 124, which is fulcrumed to the bracket 125 and at its other end is pivoted to the rod 126. Said rod is pivoted to one end of the bell-crank 127, as appears in Fig. 2, which is pivoted to the base at 128. The actuating end of said bell-crank engages the outwardly-extending pin 129 of the slide 130 and reciprocates it vertically in the slideway 131, secured to the front of the base. At the upper end of said slide 130 there is a horizontal arm 132, (shown in Fig. 6,) that extends through the slot 70 in the lower end of the air-cylinder 62. (Seen in Fig. 2.) There is adjustably attached to said slide 130 also a spring-catch 133, that has on its upper end a hook to engage the notch 334 in the lower end of the air-cylinder 62. (Shown in Fig. 2.) The function of the arm 132 is to actuate the stem 69, piston 65, stem 64, and movable bottom 63 in the air-cylinder 62 and inner or receiving mold 60, to gage the amount of glass in said inner or receiving mold. The function of the spring-catch 133 is to hold the slide 130 up into place after the bell-crank 127 has receded. When the inner or receiving mold and air-cylinder are further rotated in the operation, the air-cylinder will move away from the catch 133, whereupon the slide 130 will drop down into place, as shown in Fig. 2, with the arm 132 out of the path of the next air-cylinder as it comes around. Just before the outer movement of the end of the lever 111 is ended the catch 134 (to be seen in Fig. 6) on the sliding block 115 will engage the stem 135 of the air-valve 136, thus raising the check and allowing the air from the supply-pipe 137 to pass up through the tube 138, whereby air is expelled through the nozzle 73 (shown in Figs. 2 and 5) after the air-cylinder has been elevated and the inner or receiving mold forced up into the outer mold. As the inner end of the lever 111 is moving outward it engages the end of the curved arm 211, that is secured on the lower end of the vertical shaft 212, which is mounted in lugs from the stand 213, and on its upper end carries a long curved arm 214, to be seen in Fig. 2, which at its outer end carries the nozzle 73 and holds it in proper place for entering the port 66. Said arm 214 is pivoted on the shaft 212 and is held adjustably by the arm 215, that is rigidly secured on the upper end of said shaft 212, and the set-screw 216 in the end of said arm, that engages the arm 214, so that the end thereof can be adjusted with relation to said cylinder. A reverse movement of the lever 111 shuts off the supply of compressed air to said tube 138. The compressed air thus introduced into the air-cylinder forces the movable bottom 63 against the mass of glass in the inner or receiving mold, and thus forces the glass around the internal former, thus forming the neck and partly forming the body. After this is done the inner mold and air-cylinder are drawn down, during which the inner end of the lever 111 moves inward, and to prevent too rapid movement thereof an air-cushion 140 is provided, against whose stem 141 the bar 142, pivoted at 143, is pressed by the end of the lever 111. When said lever moves again outward, the spring 144 withdraws the lever 142 for another operation. After the glass article has been pressed and partly formed, as stated above, the mold is revolved one-sixth of a turn, during which the bottom 46 is moved to close the bottom of the outer mold. This is accomplished by the arm 47 engaging the end of the track 145, and since said arm and the bottom 46 are suspended the end of the track 145 will push the arm 47 and bottom 46 upward until the roller 48 rides on the track 145, and that forces the bottom up tight against the outer mold. The track 145 is mounted on the two-legged stand 146, that is bolted to the framework. Said track is horizontal and concentric with the shaft 19. During this part of the operation and while the bottom 46 closes the outer mold the partly-formed glass article within the mold is blown into completed form by the following means: The internal former having been elevated and moved by means hereinafter described, the upper end of the outer mold is closed by a cap 150, that is carried on an arm 151, secured to a rod 152, that vertically reciprocates through a bearing 153 in the upper end of the stand 146 and an arm 154, near the lower end of the stand. Said rod is reciprocated by the lever 100, which is pivoted at 156 to the arm 157, which is bolted to the base, as shown in Fig. 4. One end of said lever 100 is pivoted to the rod 152, and the other end has a vertical extension 159, that rides upon a roller 158, mounted on the upper side of the lever 111. After the cam 13 begins to engage the pin 110 and draws the outer end of the lever in toward the disk 111 the roller 158 comes in contact with the end 159 of the lever 100 and elevates the outer end of said lever and depresses the inner end thereof, thereby drawing down the lid 150 on the mouth of the mold. Before the lever 100 reaches the end of the movement just described the arm 161 engages the stem 162 of the air-valve 163, as appears in Fig. 4, and permits compressed air to pass from the air-supply pipe 137 through the pipe 164 into the pipe 165, that has an outlet-opening through the cap 150, whereby air is introduced into the mold and the article fully blown. After the cam 13 has ceased to engage the pin 110 on the end of the lever 111 and said lever is in the position shown in Fig. 6 the roller 158 disengages the end 159 of the lever 100, and then it drops into its inoperative position. The spring 160 around said rod 152, (seen in Fig. 4,) lying between the arm 154 and the lever 100, elevates the rod 152, and thereby elevates the cap 150, as seen in Fig. 4. This action of the lever also cuts off the air through the pipe 165 from the mold. The mold is then moved another one-sixth of a revolution, during which the fully-formed article is retained in its mold and the bottom is still in place, allowing the article to partially cool.

To discharge the article, it is necessary to spread the members of the outer mold by lowering the same, which cannot be done while the bottom is on the track 145. Therefore the arm 170 is provided to support the bottom after the mold has passed beyond the track 145 and until it has gone sufficiently far beyond the end of said track that it can be lowered. Then the arm 170 is withdrawn. During this movement the arm 170 supports the bottom by means of the lug 49, resting upon said track. This arm, which appears in Figs. 4 and 10, has the upper end thereof substantially horizontal and just inside the track 145. It is fulcrumed at 171 to a lug on the base. The arm 170 is moved out from under the mold—that is, to the right as shown in Figs. 4 and 10—by the rod 172, that is pivoted to said lever 170, passes through the bracket 157, has a guide, and is engaged by the cam extension 173 on the periphery of the disk 11. Said arm 170 is moved along with the mold by means of the spring 174, attached at one end to said arm and at the other end to the bracket 157. As the disk 11 is rotated the lug 96 on the bar 16 will engage the catch 175 on the rod 177, which is slidably mounted at one end in the bearing 178 on the trip-bar 92 and at the other end through the bearing 179, secured to the arm 180. At the right-hand end, as shown in Fig. 6, the rod 177 is turned up to form the arm 181. A second arm 182 is pivoted to the arm 181 by means of the spring 183. The arm 182 is enough longer than the arm 181 for its end to engage the tongue 184, that is pivoted to the arm 186 on the shaft 187, that is mounted in the stands 157 and 104 from the base. When said rod 177 is withdrawn longitudinally, the spring-held arm 182 moves the tongue 184 to the left, as shown in Fig. 6, into the path of the pins 188 on the side of the gear 6. There are two of these pins located diametrically opposite to each other. Said tongue is thrown out of engagement with said pins by means of a spring 189. This spring 189, however, is weaker than the spring 183, so the spring 183 will draw the tongue 184 in the path of the pins 188 when said rod 177 is actuated. When the tongue 184 comes in the path of the pins 188, it and the arm 186 are turned downward, and thereby the shaft 187 is partially rotated. On the end of said shaft there is a crank 191, connected by the bar 192 to the toggle 193, the lower end of which is pivoted to the base and the upper end to the slide 194 in the guide 195. Said slide 194 has a yoke or U-shaped top, adapted when elevated to engage and lift the two members of the outer mold, such elevation of said outer mold bringing its members together by reason of the means heretofore described. This elevating means 194 is U-shaped or double in order to permit the ready passage between the members thereof of the swinging bottom 46 of the outer mold. This top appears plainly in the right side of Fig. 6. The connecting-rod 58 (shown in Fig. 1) from the lever 57 is connected to the slide 194, and thereby said lever 57 is actuated. In this way when one outer mold is being closed the outer mold on the opposite side of the machine is being opened.

On the shaft 187 there is an arm 197, to be seen in Figs. 5 and 6, extending toward the front of the machine, and at its inner end is connected by the link 198 to the vertical slide 199 in the rear face of the guide 122, as shown in Fig. 6. The chief function of the slide 199 is to elevate, by means of the lug 200, the vertically-reciprocable rod 53, that carries the internal former 51. After the internal former has been elevated by this means it is caught and held in the elevated position by the spring-actuated catch 202, mounted on the upper end of the guide 122, and held rearward by the spring 203, as shown in Fig. 2, until said rod 53 is moved to the track 208. The upper end of said catch is provided with a point that engages the under side of the nut or lug 204 on the lower end of the rod 53.

To prevent the removal of the inner former and hold it down tightly in place while glass is being pressed around it, a spring-catch 205 engages the upper side of the lug 204 on the lower end of the rod 53. The catch is disengaged by the slide 194 in its elevation engaging a convex extension 206 on said spring-catch, which movement pushes said spring-catch backward out of engagement with the lug 204. An air-cushion 246 is attached to the guide 122 at the lower end, whose piston 10 is upheld by a spring 207, secured to the leg 21 of the stand 20 for the purpose of breaking the fall of the lever 197 and attached parts, as appears in Fig. 6. After the internal former has been elevated and while the mold is being rotated to a point of discharge there is a track 208. (Shown in Fig. 7.) Said track is concentric with the shaft 19 and is supported by the stand 146. For the purpose of carrying the internal former by means of this track there is on the lower end of the rod 53 a roller 209. The first half of said track is horizontal—that is, the distance from one mold to another or one-sixth of a circuit—so that the internal former is held at its upward limit when the cap 150 is placed on the mold. After the glass has been blown said mold is permitted to drop down by a decline in the last half of the track until the mold has reached a position where the article is discharged, and then the internal former again reenters the mold. The object in lowering the internal former just before the discharge is to hold the finished article central, thus preventing it from following either half of the mold. The article is discharged on an inclined chute 210, made of yielding wire-netting and secured to the wooden block 216.

To hold the air-cylinder 62 and inner or receiving mold 60 true while they are elevated preparatory to pressing the glass, a guide-lug 224 is placed on the end of the arms 61, which is engaged and received by the groove 225 in the back of the vertically-movable table 121, as seen in Fig. 18, when it is elevated. Said groove is flared at the upper end to receive the lug 224 when the arm 61 is rotated too far or not far enough so as to bring the inner or receiving mold into exact alinement with the outer mold above it and the air-cylinder in the exact place for the nozzle 73 to the port 66. To further hold the air-cylinder true, a spring-catch 226 is secured to the table 121, (see Fig. 7,) that engages a suitable notch in the lower end of the air-cylinder.

When the molds have revolved into position so an inner or receiving mold is under an outer mold, the gears for rotating them are suddenly and positively stopped and locked by the locking-pawl 230 (shown in Fig. 6) engaging the gear 18. It is centrally pivoted to the base and is actuated by a spring 231, fastened to the pawl. Said pawl is held out of engagement with the gear 18 by the periphery of the disk 11; but said disk has the notch 232, (seen in dotted lines in Fig. 16,) into which the end of the pawl can retreat once during each revolution of the disk, and while it is in that notch the teeth on the other end of the pawl engage the teeth of the gear 18, and while other parts of the machine continue in operation the means for revolving the molds is locked temporarily until the inner or receiving mold is forced up into the outer mold and the table 121 and arm 61 become locked, as above explained. The notch 232 begins at a point diametrically opposite the pin 12, so that as soon as the bar 16 ceases to actuate the gear 18 the pawl temporarily locks it. Said gear 18 is prevented from backward movement by the spring-actuated pawl 233.

Having described the construction and arrangement of the parts, I will now proceed to explain the operation of the machine.

Assuming the machine to be out of gear and the knife 76 to be in place to cut off the proper amount of glass from the inner or receiving mold, said inner or receiving mold is in position in front of the knife to receive the glass. After the glass is introduced into the inner or receiving mold 60 by the gatherer the pedal 84 is operated, which draws down the trip-lever 81. This releases the arm 80 on the spring-actuated rod 77, which permits the spring to quickly and suddenly actuate the knife 76 and cut off the proper amount of glass to make the desired article. As the arm 80 is released and moves the lug 107 thereon engages the end of the trip-rod 105, which through the bell-crank 103 operates the arm 102 on the rod 99, to which the pawl 98 is attached, which elevates the end of the trip-bar 92, causing the lug 96 thereon to escape the lug 97 on the bar 16. This permits the spring 91 about the shaft 7 to throw the clutch 90 into engagement with the gear 6, thus throwing the machine into operation. At the time the machine is thrown into gear by the means described the disk 11 is in the position shown in Fig. 6. As said disk is rotated in the direction indicated by the arrow the pin 12 in its travel to a point diametrically opposite to that shown in Fig. 6 through the bar 16 and radial arm 17 will rotate the gear 18 and through the shaft 19 move the molds one-sixth of a revolution. During this rotation of the molds the glass in the inner or receiving mold 60 is transferred to the table 121. The arms 61 are rotated twice to each rotation of the outer molds by reason of the gears 26, 27, and 25. (Shown in Fig. 6.) Then the point of the cam 13 begins to engage the pin 110 on the lever 111 and the further movement of said disk 11 causes said cam to draw the pin 110 inward toward the center of the disk, which causes the inner end of said lever 111 to move outward from the position shown in Fig. 6. Such movement of said lever 111 draws the block 115 to the left, as seen in Fig. 6, which through the toggle 119 elevates the table 121 and the inner or receiving mold containing the glass to the position shown in Fig. 7. The inner end of the lever 111 reaches the limit of such outward movement when the pin 110 reaches the end of the first section of the cam 13. Just before the lever 111 reaches the limit of its outward movement the end of said lever engages the pawl 211, which partially rotates the shaft 212, and thereby through the arm 214 brings the nozzle 73 into the port 66 of the cylinder. Immediately thereafter, by reason of said movement of the lever 111, the lug 134 on the sliding block 115 engages the stem 135 of the air-valve 136, which causes air from the supply-pipe 137 to pass through the pipe 138 into the air-cylinder 62. The air thus introduced by means of the movable bottom 63 forces the glass about the internal former 51 and into the neck of the outer mold, thus forming the neck and partly forming the body of the article. While the pin 110 is passing along the face of the middle section of the cam 13, which is concentric with the disk 11, the parts are at rest for a short time, during which the glass is pressed up about the internal former by the movable bottom in the inner or receiving mold, as has been explained. By that time the pin 12 has almost returned to the position shown in Fig. 6. While said pin 12 is making its return movement the gear 18 is not actuated by the connecting-bar 16, and therefore the outer and inner molds are at rest. During the latter part of the movement of the pin 12 the lug 96 on the bar 16 engages the catch 175, which withdraws the trip-rod 177, pulling in the tongue 184 into the path of the lugs 188 on the gear 6. The rotation of said gear thus depresses the arm 186 on the shaft 187, which through the arm 197 elevates the slide 199, thereby elevating the rod 53, carrying the internal former 51. This lifts the former out of the inner or receiving mold from the position shown in Fig. 7 to the position shown in Fig. 11. During the part of the operation just described the pin 110 begins to pass along the third section of the cam, when the cam 14 forces the inner end of the lever 111 inward, which depresses the table 121 and permits the air-cylinder and inner or receiving mold to move downward into the position shown in Fig. 11, leaving the partly-formed glass article in the outer mold suspended by the neck. During the two parts of the operation last described the movement of the shaft 187 through crank 191, link 192, and toggle 193 elevates the slide 196, whose top 194 engages the lower end of the members of the outer mold and by elevating them causes them to close. The lever 111 likewise near its limit of outward movement engages the lever 124 and that through the rod 126 and bell-crank 127 elevates the slide 130, that carries on its upper end the arm 132, thus lifting said arm up into the slide 70 in the lower end of the air-cylinder. The arm 132 engages the stem 69, which through the piston 65 and stem 64 elevates the movable bottom 63 in the inner or receiving mold 60, so as to gage the amount of glass necessary to form the desired article. Then the parts referred to are in the position shown in Fig. 17. When the arm 132 is thus in its upward position, the spring-catch 133 engages the notch 334 in the cylinder and holds said arm backward, when the bell-crank 127 drops back. The parts referred to continue in this position until the air-cylinder is moved away from the spring-catch 133, whereupon the slide 131 drops down into its inoperative position. In the further passage of the pin 12, just before it gets to rest, the lug 96 comes in contact with lug 97 on the bar 92, which is moved to the left, as shown in Fig. 6, thus uncoupling the clutch 90 and throwing the machine out of gear. During the operation above described the gatherer has obtained another supply of glass and has dropped it into the inner or receiving mold 60, which at the time is immediately in front of the knife 76. He again operates the pedal and drops the lever 81, which cuts off the proper amount of glass and sets the machine in motion, as above described. During the next revolution of the disk 11 or one-sixth revolution of the outer molds the mold in which the partly-formed glass article is suspended is moved from the table 121, as shown in Fig. 11, to a position one-sixth of a turn to the left, as shown in Fig. 4, where the article is blown, as follows: When the lever 111 begins to move, the roller 158 by engaging the wide end of the lever 100 depresses the inner end of said lever 100 and the rod 152, that carries the cap 150, and brings said cap down on the mouth of the outer mold. In the last part of said movement of the lever 100 the arm 161 engages the stem 162 of the air-valve 163 and admits air into the pipe 165, whereby the article is blown. During this part of the operation the internal former is elevated out of the air-cylinder, as shown in Fig. 4. This ends another step in the operation, there being now one mold containing the blown article, another mold wherein the article has just been pressed and is suspended in the outer mold, and another inner or receiving mold is in position in front of the knife 76 to receive its supply of glass. Another operation of the pedal operates the knife 76 and sets the machine in motion, again causing the disk 11 to make a revolution and the outer molds to move one-sixth of a revolution. Just before the lever 111 reaches the end of its movement each time, the roller 158 releases the lever 100, which enables the spring 160 to slightly elevate the cap 150 from the outer mold and at the same time shuts off the supply of air through the pipe 165. About midway of the next step of the operation the rod 53, carrying the internal former, which has been riding upon the horizontal portion of the track 208, reaches the declining portion of said track, as appears in Fig. 4, and as said rod 53 runs down on this portion of the track the internal former is lowered and enters the mouth of the outer mold just before the discharge of the article therefrom for the purpose of holding the article central during its discharge. During this step of operation also just before the mold reaches the end of the track 145, a lug 49 on the bottom 46 engages the horizontal upper end of the arm 170 and said arm moves thereafter along with said mold until the mold has passed beyond the end of the track 145. This movement of the arm 170 is caused by the spring 174. Toward the latter part of the revolution of the disk 11 the cam extension 173 engages the rod 172 and quickly moves the arm 170 backward from under the bottom of the outer mold into the position shown in Fig. 4. This permits the bottom of the mold to drop down out of the way. At the time of the step in the operation just described the end of the lever 57 engages the top of the outer mold and forces the same downward, thus separating the members thereof, whereupon the finished article drops on the chute 210 and is discharged into a suitable receptacle. This movement of the arm 57 is caused by the upward movement of the link 58, attached to the guide 196, and is elevated through it. When one mold is being opened, the mold on the opposite side is being closed. Thus it is seen that this machine automatically cuts off the amount of glass required for each article, moves the inner or receiving mold containing the glass beneath the outer mold, then up around the internal former, partly forms the glass article by the pressure of compressed air around the internal former in the inner or receiving mold, withdraws the inner or receiving mold from the outer mold after the article is thus partly formed, leaving it suspended by its neck in the outer mold, elevates the internal former out of the mouth of the outer mold, and places the cap on the upper end of the outer mold, and also closes the bottom thereof. Then it blows the article therein into finished form and discharges it, bringing the internal former down again into the outer mold just before such discharge for guiding the article in its discharge to prevent its injury by the mold. At each revolution of the disk 11 a glass article is discharged from the machine and six of them are discharged at each revolution of the series of molds. In this way the molds, both outer and inner, have time to cool before they are again brought into use. The machine also automatically opens and closes the outer mold as occasion requires. Only one operator is needed. He obtains the glass, puts it in the inner or receiving mold, and trips the machine. The machine then makes the article out of such glass while he is obtaining another supply. The machine also automatically stops at each revolution of the disk 11 long enough to permit the glass to be dropped by the operator into an inner or receiving mold, another body of glass to be pressed and partly formed in another inner mold, another body of glass after being partly formed to be fully blown, and another article to be discharged—all four of these things to be done simultaneously during such cessation in the operation of the machine. Thus half of the outer molds are in use and the other half not in use in every step of the operation, while two out of every three inner or receiving molds are in use during every step of the operation. By having time for the molds to cool as the machine continues its operation it can run continuously without injury.

What I claim as my invention, and desire to secure by Letters Patent, is—

1. In a machine for making hollow glassware, an internal former, a receiving-mold, means for moving such mold up about the former after receiving the glass, an air-cylinder upon the upper end of which said mold is mounted, and means actuated by the air in said cylinder for forcing the glass in said mold up about said former.

2. In a machine for making hollow glassware, an internal former, a receiving-mold, means for moving such mold up about the former after receiving the glass, an air-cylinder upon the upper end of which said receiving-mold is mounted, a movable bottom in the receiving-mold, a piston in the air-cylinder arranged to elevate the movable bottom and means for introducing air into the air-cylinder to actuate the piston and force the glass in said mold up about said former.

3. In a machine for making hollow glassware, an internal former, a receiving-mold, means for moving such mold up about the former after receiving the glass, an air cylinder upon the upper end of which said mold is mounted, a port in the air-cylinder, means for introducing air into the air-cylinder through the port after the mold has been supplied with glass, a movable bottom in the receiving-mold, a piston in the air-cylinder connected with such movable bottom, and a stop for limiting the movement of the piston so it will not close the air-port.

4. In a machine for making hollow glassware, a receiving-mold, a movable bottom therein, a vertically-sliding arm, connection between the arm and the movable bottom for elevating it, and adjustable means for holding the arm in its upper position.

5. In a machine for making hollow glassware, a receiving-mold, a movable bottom therein, a vertically-sliding arm, connection between the arm and the movable bottom for elevating it, and an adjustably-mounted spring-catch for holding the arm in its elevated position.

6. In a machine for making hollow glassware, a receiving-mold, a movable bottom therein, a vertical cylinder upon the upper end of which said mold is mounted and having a slot and a notch at its lower end, an arm adapted to move upward through such slot, connection between said arm and the movable bottom for elevating it, and a spring-catch adjustably mounted on the sliding arm and adapted in its upper position to catch the notch in said cylinder.

7. In a machine for making hollow glassware, a receiving-mold, a movable bottom therein, a vertical cylinder upon the upper end of which said mold is mounted and having a slot or notch at its lower end, an arm vertically sliding through said slot, connection between said arm and the movable bottom for elevating it, a spring-catch adjustably mounted on said arm and adapted in its upper position to catch in said notch, and means for moving said mold and cylinder away from said arm and catch, whereby said catch is released.

8. In a machine for making hollow glassware, a receiving-mold, an air-cylinder upon the upper end of which said inner or receiving mold is mounted, a movable bottom in said mold with a depending stem, a piston in the air-cylinder connected with said stem, means for introducing air into said air-cylinder, a vertically-movable check-rod through the lower end of the air-cylinder, and means for vertically moving said check-rod, whereby said piston and movable bottom are actuated.

9. In a machine for making hollow glassware, a receiving-mold, a knife so mounted as to pass immediately over the top of said mold after the glass is put therein to cut off the proper amount of glass, and a trip mechanism for simultaneously actuating the knife and starting the machine with each charge of glass.

10. In a machine for making hollow glassware, a series of horizontally-rotatable receiving-molds, a knife so mounted as to pass immediately over the top of each of said molds as they are rotated after the glass is put therein to cut off the proper amount of glass, and a trip mechanism for simultaneously actuating the knife and starting the machine with each charge of glass.

11. In a machine for making hollow glassware, a vertical receiving-mold, a spring-actuated vertical shaft, a knife so mounted on said shaft that it will when operated pass immediately over the top of said mold, means for returning and holding said rod in an inoperative position, and means for releasing said holding device whereby said rod and knife will be actuated by its spring.

12. In a machine for making hollow glassware, a vertical receiving-mold, a vertical spring-actuated rod, a knife on said rod adapted to pass over the top of said mold when actuated, a trip-arm on said rod, a trip-lever adapted to engage said arm and hold said rod in the inoperative position, and a pedal attached to said trip-lever for releasing said rod whereby the spring will actuate the knife.

13. In a machine for making hollow glassware, a vertical receiving-mold, a rotating arm upon which said mold is carried, a vertical spring-actuated rod near the path of said mold, a knife on said rod adapted to pass over the top of the mold, an arm extending from said rod in the path of the mold whereby the mold in its movement will return the knife-rod to an inoperative position, a trip mechanism for holding said rod in its inoperative position, and means for releasing said trip mechanism.

14. In a machine for making hollow glassware, an outer mold, an inner or receiving mold, a movable support under said inner or receiving mold, and an adjustable toggle for elevating said movable support whose arms when in line with each other furnish a solid support therefor.

15. In a machine for making hollow glassware, an outer mold, an inner or receiving mold, an air-cylinder upon the upper end of which said inner or receiving mold is mounted, a movable bottom in said inner or receiving mold, a piston in the air-cylinder connected with said movable bottom, means for introducing air into said air-cylinder, a vertically-movable table under said air-cylinder, and means for vertically moving said table whereby the air-cylinder and inner or receiving mold are elevated.

16. In a machine for making hollow glassware, an outer mold, an internal former insertible in the upper end of the outer mold, an inner or receiving mold insertible in the lower end of the outer mold, and means for simultaneously removing said internal former and inner or receiving mold from said outer mold.

17. In a machine for making hollow glassware, a horizontally-rotatable mold, a bottom pivotally suspended from said mold, and means engaged by said bottom in the rotation of the mold for swinging the bottom shut to close the mold.

18. In a machine for making hollow glassware, a horizontally-rotatable mold, a bottom pivotally connected therewith, and a track in line with the movement of the mold for engaging the bottom and forcing it up to close the mold.

19. In a machine for making hollow glassware, a series of molds so mounted as to be rotatable horizontally about a center, a bottom pivotally connected with each of said molds, and a track in the path of said bottoms adapted to close them singly as they rotate and hold them closed while the article is being blown and until it is ready to be discharged from the mold.

20. In a machine for making hollow glassware, a horizontally-rotatable mold, a vertically-movable internal former so mounted as to rotate with said mold, means for elevating said internal former, and a track that supports the internal former in an elevated position.

21. In a machine for making hollow glassware, a horizontally-rotatable mold, a vertically-movable internal former adapted to enter the upper end of said mold, means for blowing the article through the upper end of said mold, means for elevating said internal former out of the mold, a track that supports said internal former in its upper position while the article is being blown, said track declining to permit the internal former to re-enter the mold before the article is discharged.

22. In a machine for making hollow glassware, a series of horizontally-rotatable molds, a series of vertically-movable internal formers so mounted as to rotate with said molds, means for introducing air into the upper end of one of said molds at a time, means for elevating one of said internal formers at a time, and a track for supporting said internal formers in the elevated position, the first portion of said track being horizontal over which said former passes while the article is being blown and the latter portion of said track declining to cause said internal former to enter the mold before the article is discharged.

23. In a machine for making hollow glassware, a horizontally-rotatable mold, a bottom pivotally connected therewith, a stationary track on which said bottom travels and whereby it is held closed, and a movable arm that carries said bottom after it leaves the stationary track until time for the discharge of the article.

24. In a machine for making hollow glassware, a horizontally-rotatable mold, a bottom pivotally connected therewith, a stationary track on which said bottom travels and whereby it is held closed, a movable arm that carries said bottom after it leaves the stationary track until time for the discharge of the article, and means for moving said arm from under the bottom of the mold.

25. In a machine for making hollow glassware, a horizontally-rotatable mold, a bottom pivotally connected therewith, a stationary track on which said bottom travels and whereby it is held closed, a movable arm that carries said bottom after it leaves the stationary track until time for the discharge of the article, a spring-actuated arm that carries said bottom after it leaves the stationary track until time for the discharge of the article, a driving cam-wheel, and a rod extending from said arm to said cam-wheel to remove said arm from under the bottom of the mold.

26. In a machine for making hollow glassware, a mold, a removable bottom for the mold, a removable support for said bottom, a former or guide to enter the upper end of the mold and the article being formed therein to guide the discharge of said article, and means for introducing said guide before the removal of the support for the bottom.

27. In a machine for making hollow glassware, a mold composed of two vertical members, a frame, bars connecting said members of the mold to said frame whereby the vertical movement of the members of the mold will separate them or unite them, and means actuated by the machine for giving to the members of the mold such vertical movement.

28. In a machine for making hollow glassware, a mold formed of two vertical members, a frame, bars so connecting said members of the mold to the frame that said members will be separated when further depressed, and a lever actuated by the machine that engages the upper ends of the members of the mold and depresses them to discharge the article therefrom.

29. In a machine for making hollow glassware, a mold comprising two vertical members, a removable bottom, a frame, bars so connecting the vertical members of the mold with the frame that when the members of the mold are depressed they will separate, means actuated by the machine for depressing said members of the mold to discharge the article therefrom, and means for removing the bottom from the mold before the vertical members thereof are separated.

30. In a machine for making hollow glassware, a mold comprising two vertical members and a pivotally-supported removable bottom, means for guiding said vertical members toward or away from each other, a frame, bars so connecting said vertical members with said frame that they will be separated when depressed, a lever actuated by the machine that engages the top of said members and depresses them to discharge the article from the mold, an arm for holding the bottom closed, and means for removing said arm from under the bottom before the vertical members of the mold are depressed.

31. In a machine for making hollow glassware, a mold formed of two members, a frame, bars so connecting said members with said frame that when said members are elevated they will be united, a vertical slide for connecting the lower end of said members and elevating them, and means operated by the machine for actuating said vertical slide.

32. In a machine for making hollow glassware, a mold having two vertical members, a frame, bars for so connecting said vertical members of the mold with said frame that when the members of the mold are elevated they will be united, a vertical slide to engage the lower end of said members of the mold, a toggle for connecting said vertical slide, and means connected with the driving mechanism of the machine for actuating the toggle.

33. In a machine for making hollow glassware, a horizontally-rotatable mold comprising two vertical members and a swinging bottom, a frame, bars so connecting said vertical members of the mold with said frame that the elevation of said members of the mold will cause them to unite, a pair of vertically-movable arms for engaging the lower end of said vertical members of the mold to elevate the same, said arms being sufficiently far apart to permit the passage between them of the swinging bottom of the mold, and means operated by the machine for actuating said vertically-movable arms.

34. In a machine for making hollow glassware, a mold formed of two vertical members, means for guiding them together or away from each other, a frame, bars so connecting said vertical members to the frame that the independent vertical movement of either the frame or members of the mold will cause the members of the mold to unite or separate, such bars being of such length that when the members of the mold are united the inner end of the bars will be above the plane of the outer ends thereof whereby the members of the mold will be firmly united.

35. In a machine for making hollow glassware, a series of horizontally-rotatable molds, an internal former for each of said molds, vertically-movable rods for carrying said internal formers, a vertically-movable slide over whose upper end said internal-former-supporting rods pass in their rotation, and means for actuating said slide to elevate the internal former out of the mold.

36. In a machine for making hollow glassware, a series of horizontally-rotatable molds, an internal former for each of said molds, vertically-movable rods for carrying said internal formers, a vertically-movable slide over whose upper end said internal-former-supporting rods pass in their rotation and a lever actuated by the machine and connected with said slide for elevating such support.

37. In a machine for making hollow glassware, an outer mold, a vertically-movable internal former adapted to enter the upper end of the outer mold, an inner or receiving mold adapted to move up about said internal former, means for moving said internal former into the outer mold in advance of the inner or receiving mold, and a catch for holding said internal former down after it has been lowered and while said inner or receiving mold is being forced up.

38. In a machine for making hollow glassware, a vertical outer mold, an internal former adapted to enter the upper end of said outer mold, a vertically-movable rod on which said internal former is carried, an inner or receiving mold adapted to be forced up in said outer mold about said internal former, and a spring-catch for engaging the lower end of said vertically-movable rod to hold the internal former down while the inner or receiving mold is being forced up.

39. In a machine for making hollow glassware, a series of outer molds, a series of horizontally-rotatable arms in which said outer molds are mounted, an internal former for each outer mold adapted to be inserted in the upper end thereof, rods on which the internal formers are carried that are vertically movable in said rotatable arms, a lug on the lower end of said rods, and a spring-catch so located that as said rods rotate the lugs thereon will pass under said spring-catch whereby the internal formers will be held down.

40. In a machine for making hollow glassware, a series of outer molds, a series of horizontally-rotatable arms on which said outer molds are mounted, an internal former for each outer mold adapted to be inserted in the upper end thereof, rods on which the internal formers are carried that are vertically movable in said rotatable arms, a lug on the lower end of said rods, a spring-catch so located that as said rods rotate the lugs thereon will pass under said spring-catch whereby the internal formers will be held down, a vertically-movable slide so placed as to be under said internal-former-supporting rods while they are held down by said catch, means operated by the machine for actuating said slide, and means for disengaging said spring-catch by the elevation of the slide.

41. In a machine for making hollow glassware, a receiving-mold, an air-cylinder upon the upper end of which said inner or receiving mold is mounted and provided with an air-port, a vertical spline on said air-cylinder, a horizontally-rotatable arm provided with a ring for supporting said air-cylinder and receiving-mold, said ring having a groove through which said spline operates to guide the air-cylinder when vertically moved, and means for supplying air to said air-cylinder that is provided with a nozzle to enter the air-port therein, whereby the air-cylinder will always be held true so that said nozzle will engage the air-port.

42. In a machine for making hollow glassware, a receiving-mold, a horizontally-rotatable arm that supports said mold on whose outer end a stop-lug is provided, and means for elevating said mold when desired provided with a groove to receive said stop-lug when elevated to lock said rotating arm and hold the mold in place.

43. In a machine for making hollow glassware, an outer mold, an inner or receiving mold, a horizontally-rotatable arm for carrying the inner or receiving mold provided on its outer end with a stop-lug, vertically-movable means for elevating the inner or receiving mold into said outer mold, vertically-movable means for guiding the movement thereof, and a groove in said vertically-movable means to receive said stop-lug and lock said rotating arm and hold the inner or receiving mold within said outer mold.

44. In a machine for making hollow glassware, a receiving-mold, a horizontally-rotatable arm for carrying said mold that is provided on its outer end with a guide-lug, and means for elevating said mold that is provided with a groove to receive the lug on said rotatable arm when the mold is elevated, said lug being flaring at one end to aline said mold.

45. In a machine for making hollow glassware, a receiving-mold, a movable bottom in said mold, means for horizontally rotating said mold to and from a position for receiving the glass, adjustable means for elevating the movable bottom in said mold to gage the amount of glass, and means for operating such elevating mechanism while said mold is in such position.

46. In a machine for making hollow glassware, a receiving-mold, a rotatable arm for carrying said mold, means for intermittently actuating said rotatable arm, a movable bottom in said mold, adjustable means for elevating said movable bottom to gage the amount of glass, and means for actuating such elevating mechanism during the intermission of the means for rotating said rotatable arm.

47. In a machine for making hollow glassware, a receiving-mold, an arm 30 for carrying said mold, a vertical shaft on which said mold is mounted, a gear 25 on said shaft for rotating it, the main driving-gear 18 which is provided with a series of catches in its side face, intermediate gears 26 and 27 between said gears 18 and 25, a shaft 19 on which the gear 18 is mounted, a radial arm 17 pivoted on the shaft 19, a pawl on the outer end of said radial arm for engaging the notches in the wheel 18, the cam-disk 11, means for driving said cam-disk, the connecting-rod 16 pivoted at one end to the cam-disk and at the other end to the radial arm 17 for intermittently driving said gear 18, the cam 12 on said cam-disk 11, the lever 111, a pin 110 on said lever to engage said cam, the lever 124 that is actuated by said lever 111 near its outer movement, the movable bottom in said mold, the slide 130 carrying the arm 132 for elevating said movable bottom to gage the amount of glass, the bell-crank 127 for actuating said sliding plate 130, and the rod 126 for connecting said lever 124 with said bell-crank 127.

48. In a machine for making hollow glassware, a mold, an arm 30 for carrying said mold, a vertical shaft 28 on which said mold is mounted, a gear 25 on said shaft for rotating it, the main driving-gear 18 which is provided with a series of catches in its side face, intermediate gears 26 and 27 between said gears 18 and 25, a shaft 19 on which the gear 18 is mounted, a radial arm 17 pivoted on the shaft 19, a pawl on the outer end of said radial arm for engaging the notches in the wheel 18, the cam-disk 11, means for driving said cam-disk, the connecting-rod 16 pivoted at one end to the cam-disk and at the other end to the radial arm 17 for intermittently driving said gear 18, and the lever 230 with teeth to engage the teeth of the gear 18 and operated by the cam-disk 11.

49. In a machine for making hollow glassware, a receiving-mold, the arm 30 for carrying said mold, the shaft 28 on which arm 30 is mounted, the gear 25 on said shaft 28 for actuating it, the driving-gear 18 provided with side notches, the intermediate gears 26 and 27 for transmitting power from gear 18 to gear 25, the shaft 19 on which said gear is mounted, the radial arm 17 pivoted on the shaft 19, the pawl 22 mounted on the outer end of said radial arm and adapted to engage the notches in the gear 18, the disk 11, the connecting-rod 16 from said disk to the radial arm 17, the shaft 7 for driving said disk 11, the gear 6 for driving said shaft 7 having on one side a clutch-face, the clutch 90 mounted on said shaft 7 for throwing said shaft in and out of gear with the gear 6, the lever 93 connected at one end with said clutch 90, the trip-bar 92 pivotally connected at one end to said lever 93 and movable endwise, the lug 96 on said bar 92, and the lug 97 on the bar 16 for engaging said lug 96 at every revolution of the disk 11.

50. In a machine for making hollow glassware, a receiving-mold, means for horizontally rotating the same to and from a position for receiving the glass, a spring-actuated knife for cutting off the desired amount of glass for said mold, and means for releasing said knife whereby the spring will actuate it before said mold leaves said position.

51. In a machine for making hollow glassware, a receiving-mold, means for horizontally rotating the same to and from a position for receiving the glass, means actuated by the machine for throwing the machine out of gear when said mold is in such position, a knife for cutting off from said mold the amount of glass desired, and means for simultaneously operating said knife and starting said machine in operation.

52. In a machine for making hollow glassware, a receiving-mold, means for horizontally rotating the same to and from a position for receiving the glass, means actuated by the machine for throwing it out of gear when the mold is in such position, a vertical spring-actuated rod, a knife mounted thereon adapted to cross the upper end of said mold, means for returning said knife and rod to its unoperated position, an arm on the lower end of said rod, a trip-lever adapted to engage and hold said arm in an inoperative position, means for operating said trip-lever when desired, and means actuated by the arm at the lower end of said knife-rod when released for throwing the machine into gear.

53. In a machine for making hollow glassware, a receiving-mold, a horizontally-rotatable arm 61 for carrying the same, the shaft 28 on which said arm is mounted, the gear 25 secured to said arm for actuating it, the main gear 18, the intermediate gears 26 and 27 between said gears 18 and 25, the rotary disk 11, means connecting said disk and the gear 18 whereby the latter is actuated, the shaft 7 for driving the disk 11, the gear 6 for driving the shaft 7 having on one side a clutch-face, the clutch 90 on said shaft 7 to engage said clutch-face for operating the machine, the lever 93 pivoted at one end to the framework and at the other end to said clutch, the trip-bar 92 pivoted at one end to said lever 93 and movable endwise, the lug 97 on said bar, the lug 96 on the bar 16 adapted to engage the lug 97 at each revolution of the disk 11 and throw the machine out of gear, the spring-actuated rod 77, the arm 80 secured thereto, the spring-supported trip-lever 81 for engaging said arm 80 and holding the rod 77 in an inoperative position, a pedal for operating said trip-lever 81, the lug 107 on the arm 80, the longitudinally-moving arm 105 so mounted as to be actuated by the lug 107 when the trip-lever 81 releases the spring-actuated rod 77, the bell-crank 103 connected at one end with said rod 105, the arm 102 engaged by the other end of said bell-crank, the rod 99 on which said arm 102 is secured, the arm 98 secured on said rod 99 and extending under the free end of bar 92 whereby when said arm 98 through the rod 99 is actuated said bar 92 is so elevated that the lug 96 is released from engagement with the lug 97, and the spring 91 on the shaft 7 for forcing the clutch 90 into the operative position when said bar 92 is thus released.

54. In a machine for making hollow glassware, an outer mold, an inner or receiving mold beneath the outer mold, an air-cylinder on the upper end of which said inner or receiving mold is mounted having an air-port therein, a movable bottom in said inner or receiving mold, a piston in said air-cylinder for elevating the inner or receiving mold, means for elevating the air-cylinder and inner or receiving mold so as to introduce the inner or receiving mold into the outer mold, an air-tube adapted to engage the air-port in the air-cylinder for the introduction of air therein, and means for turning on the air through such air-tube after the inner or receiving mold has been elevated.

55. In a machine for making hollow glassware, an inner or receiving mold, a movable bottom therein, an air-cylinder having an air-port therein on the upper end of which said inner or receiving mold is mounted, a piston therein for actuating such movable bottom, means for elevating said inner or receiving mold and the air-cylinder, an air-tube leading from some suitable source of supply provided with a nozzle adapted to enter the air-port in said air-cylinder, an oscillatory arm that carries on its outer end said nozzle and moves the same to and away from said air-port, and a common means for operating said arm and the means for elevating the inner or receiving mold and air-cylinder.

56. In a machine for making hollow glassware, an outer mold, an inner or receiving mold, a movable bottom therein, an air-cylinder upon the upper end of which the inner or receiving mold is mounted having an air-port therein, a piston in said air-cylinder for elevating such movable bottom, a vertically-movable table 121 under said air-cylinder, the toggle 119 pivoted at one end to said vertically-moving table, the bracket 120 to which the other end of said toggle is pivoted, the rod 118 pivoted at one end to said toggle, the sliding plate 115 which is pivotally connected with the other end of said rod 118, the lever 111 pivotally connected to said sliding plate 115, means for actuating said lever, the vertically-oscillatory shaft 212, the arm 211 secured to the lower end thereof that is actuated by said lever 111, the arm 214 secured to the upper end of said shaft 212, the nozzle 73 on the end of the arm 214 adapted to engage the air-port in the air-cylinder, the air-tube 138 connected with said nozzle at one end, the pipe 137 leading from a suitable source of compressed air connected with the other end of the tube 138, an air-valve for admitting air from the pipe 137 into the tube 138 so located as to be operated by said lever 111 while completing the actuation of the toggle 119, and the spring 211 for withdrawing the nozzle 73 from the air-port after the return movement of the lever 111 begins.

57. In a machine for making hollow glassware, a series of outer molds, a series of inner or receiving molds, separate means for rotatably mounting said kinds of molds so that the inner or receiving molds will pass beneath the outer molds in the order of their rotation, a movable bottom in said inner or receiving molds, means for forcing said movable bottom upward while the inner or receiving mold is within the outer mold partly to form the article, and means for withdrawing said inner or receiving mold after the article is thus partly formed.

58. In a machine for making hollow glassware, an outer mold, an internal former adapted to enter the upper end of said outer mold, a vertically-movable rod upon the upper end of which said internal former is carried, a sliding plate 194 mounted beneath said vertically-movable rod, the link 198 pivotally connected with said sliding plate, the arm 197 pivoted at one end to said link, the shaft 187 to which the other end of said arm is secured, the arm 186 secured to said shaft 187, the tongue 184 pivoted to said arm 186, the main drive-gear 6 provided with the lugs 188 adapted to engage said tongue 184 when it is moved into the path of said lugs, the rod 177 adapted when moved to move said tongue 184 into the path of said lugs having on its other end a catch 175, the driving-disk 11, means connected therewith for engaging the catch on the rod 177 and withdraw the same at each revolution of the disk 11, the cam-plate 14 on the disk 11, the lever 111 with a pin adapted to engage said cam, the sliding plate 115 pivotally connected with said lever 111, an inner or receiving mold adapted to be forced up into said outer mold around the internal former therein, an air-cylinder upon the upper end of which said inner or receiving mold is mounted having at its lower end a notch, a table under said air-cylinder provided with a hook to engage said notch, the toggle 119 connected at one end with said table 121, the bar 118 pivoted at one end to the joint of the toggle and at the other end to the sliding block 115, whereby the internal former is elevated out of the outer mold simultaneously with the removal of the inner or receiving mold from the outer mold.

59. In a machine for making hollow glassware, a series of molds, means actuated by the machine for partly forming the article by pressing in one mold, means actuated by the machine for blowing into finished form the article pressed in the preceding operation of the machine, and means actuated by the machine for holding said molds, whereby the initial introduction of the glass into one mold, the partial formation of the article by pressing in another mold, and the completion of it by blowing in a third mold will be simultaneous and automatic.

60. In a machine for making hollow glassware, a series of outer molds, a series of inner or receiving molds, means actuated by the machine for horizontally rotating said molds so that the inner or receiving molds will move into a position under the outer molds in the order of their rotation, means actuated by the machine for elevating said inner or receiving molds into the alining outer mold, means actuated by the machine for partly forming the article therein, means for blowing the partly-formed article in the outer mold into finished form, and means actuated by the machine for holding said molds so that the introduction of glass into the inner or receiving mold, the partial forming of the article by the next inner or receiving mold in the series, and the blowing of the article partly formed will be simultaneous.

61. In a machine for making hollow glassware, a series of inner or receiving molds, a series of outer molds, separate means for mounting both kinds of molds so that the inner or receiving molds will be moved into a position under the outer molds in the order of their rotation, means for moving the inner or receiving molds up into the outer molds, internal formers, means for moving the internal formers successively down into the outer molds, a removable bottom for the outer mold, means for closing said removable bottom after the article has been partly formed by pressing, means for introducing air into the end of the outer mold for blowing the article into completed form, and means for so holding said molds that when one inner or receiving mold is in position to receive the glass initially another inner or receiving mold is pressing the glass about the former in one of the outer molds and the previously-pressed article is being blown into completion in another outer mold.

62. In a machine for making hollow glassware, a series of inner or receiving molds, a series of outer molds, separate means for mounting both kinds of molds so that the inner or receiving molds will be moved into a position under the outer molds in the order of their rotation, means for moving the inner or receiving mold up into the outer mold, internal formers, means for moving the internal formers successively down into the outer molds, a removable bottom for the outer molds, means for closing said removable bottom after the article has been partly formed by pressing, means for introducing air into the end of the outer mold for blowing the article into completed form, means for discharging the finished article, and means for holding all of said molds so that the initial introduction of the glass into one mold, the partial formation of the article by pressing in another mold, the blowing of the article into complete form in a third mold and the discharge of the finished article from the fourth mold will occur simultaneously.

63. In a machine for making hollow glassware, a series of inner or receiving molds, the arm 61 for carrying said inner or receiving molds, the shaft 28 upon which said arm is mounted, the gear 25 secured to said shaft for actuating it, the gear 18 provided with a series of side notches, the intermedate gears 26 and 27 between said gear 18 and the gear 25 through which the latter is actuated, the shaft 19 on which the gear 18 is mounted, the radial arm 17 pivoted at one end to said shaft 19, a pawl 22 on the outer end of said radial arm adapted to engage the notches in the gear 18, the disk 11, the rod 16 pivotally connecting said disk to the radial arm 17, the shaft 7 for driving said disk 11, the gear 6 for driving said shaft 7, the cam 13 on the disk 11, the lever 111, the pin 110 on one end of said lever adapted to be engaged by the cam 13, the sliding block 115 to which the other end of said lever is pivoted, the vertically-movable table 121 adapted when moved to elevate the inner or receiving mold into the outer mold, the toggle 119 for actuating said vertically-movable table, the bar 118 connecting said toggle with the sliding block 115, means for holding the internal former down as the inner or receiving mold is moved up around it in the outer mold, means for elevating the external former after the article is pressed, means for holding it in an elevated position, a cap for closing the upper end of the outer mold after the internal former has been removed, a vertically-movable rod 152 for supporting said cap, a conduit for the introduction of air through said cap into said mold, a valve for controlling the passage of air through said conduit, the lever 100 pivoted at one end to said rod 152, the roller 158 on the lever 111 for engaging the free end of said lever 100 and elevating it, whereby the rod 152 is depressed, and means connected with said rod for operating said air-valve.

64. In a machine for making hollow glassware, a series of outer molds formed of two vertical members, suitable means for actuating said members to and away from each other, a frame for each outer mold, a bar connecting each vertical member of each mold with the frame so that when said members of the mold are depressed they will be separated and the mold opened, means for partly forming the article by pressing in one mold, means for blowing into finished form the article partly completed by pressing in the former operation of the machine, means for discharging the finished article, means for holding all of said molds so that the initial introduction of the glass into one mold, the partial formation of the article in another mold, the blowing of the article into completed form in a third mold and the discharge of the finished article in a fourth mold will be simultaneous, the cross-rod 57 for depressing the mold containing the finished article for opening the same and discharging the article therefrom, the sliding plate 194, the rod 58 for connecting said sliding plate and the lever 57, the toggle 193 for actuating said sliding plate, the rod 192 pivoted at one end to said toggle, the arm 191 pivoted at the other end to said bar 192, the shaft 187 upon which the arm 191 is secured, the arm 186 secured to said shaft 187, the tongue 184 pivoted to said arm 186, lugs on said driving-gear 6 that engage and actuate said tongue when it is drawn into the path of said lugs, the rod 177 for drawing said tongue into the path of said lugs having on its other end a catch, the disk 11, the bar 16 pivoted at one end thereto and the lug 96 on the bar 16 that engages the catch on the rod 152 at each revolution of the disk 11.

65. In a machine for making hollow glassware, an outer mold, an inner or receiving mold, a spur-gear and connections for horizontally rotating said molds so that the inner or receiving mold will move into a position under the outer mold, a locking-bar for engaging the teeth of the spur-gear and locking it temporarily from movement when the inner or receiving mold is in line under the outer mold, and means actuated by the machine for releasing and locking said locking-bar.

66. In a machine for making hollow glassware, a series of outer molds, a series of inner molds, a spur-gear and connections for horizontally rotating said molds so that the inner or receiving molds will move into a position under the outer molds successively, a spring-controlled locking-bar for engaging the teeth of said driving-gear and stopping it temporarily from movement, and a rotary disk whose periphery engages said locking-bar and holds it out of engagement with said spur-gear and having a recess in its periphery that permits said locking-bar to engage and lock said spur-gear every time the inner or receiving mold is moved into line under the outer mold.

In witness whereof I have hereunto affixed my signature in the presence of the witnesses herein named.

GEORGE C. PYLE.

Witnesses:
M. C. BUCK,
V. H. LOCKWOOD.